United States Patent
Reesor et al.

(10) Patent No.: US 7,843,954 B2
(45) Date of Patent: Nov. 30, 2010

(54) SCALEABLE VOIP TELEPHONE LINE CIRCUIT

(75) Inventors: Gordon J. Reesor, Ottawa (CA); Zaher Baidas, Kanata (CA); Paul Nicholas, Ottawa (CA)

(73) Assignee: Zarlink Semiconductor Inc., Kanata, ON (CA)

( * ) Notice: Subject to any disclaimer, the term of this patent is extended or adjusted under 35 U.S.C. 154(b) by 61 days.

(21) Appl. No.: 12/332,563

(22) Filed: Dec. 11, 2008

(65) Prior Publication Data

US 2009/0154484 A1   Jun. 18, 2009

(30) Foreign Application Priority Data

Dec. 17, 2007  (GB)  .................. 0724515.2

(51) Int. Cl.
   *H04L 12/66*    (2006.01)
(52) U.S. Cl. ...................... 370/419; 370/442
(58) Field of Classification Search ............... 370/442, 370/352, 235; 709/228; 398/72
   See application file for complete search history.

(56) References Cited

U.S. PATENT DOCUMENTS

| | | | |
|---|---|---|---|
| 6,405,258 B1 * | 6/2002 | Erimli et al. ................ | 709/235 |
| 6,728,239 B1 * | 4/2004 | Kung et al. ................. | 370/352 |
| 6,795,448 B1 * | 9/2004 | Lee et al. .................... | 370/419 |
| 6,944,174 B1 * | 9/2005 | Chow .......................... | 370/413 |
| 7,010,607 B1 * | 3/2006 | Bunton ....................... | 709/228 |
| 7,180,889 B1 * | 2/2007 | Kung et al. ................. | 370/352 |
| 7,606,156 B2 * | 10/2009 | DeLangis .................... | 370/235 |
| 7,672,591 B2 * | 3/2010 | Soto et al. .................... | 398/72 |
| 2002/0013911 A1 * | 1/2002 | Cordella et al. ............ | 713/201 |
| 2002/0064152 A1 | 5/2002 | Lemley et al. | |
| 2002/0126689 A1 * | 9/2002 | Redington .................. | 370/442 |
| 2007/0061487 A1 * | 3/2007 | Moore et al. ............... | 709/246 |
| 2009/0041004 A1 * | 2/2009 | Emmanuel .................. | 370/352 |

FOREIGN PATENT DOCUMENTS

JP    2002217946 A2    8/2002
WO   2004/054174 A1    6/2004

OTHER PUBLICATIONS

"An Overview of the Etherphone System and its Applications", P. T. Zellweger et al., Xerox Palo Alto Research Center, Palo Alto, CA 94304, 1988, IEEE, pp. 160-168.

* cited by examiner

*Primary Examiner*—Thong H Vu
(74) *Attorney, Agent, or Firm*—Marks & Clerk; Richard J. Mitchell

(57) ABSTRACT

A telephone subscriber line device for providing an interface between a legacy telephone circuit based on circuit-switched technology and a packet network has a legacy interface for connection to telephone circuit; a packet interface for connection to a packet network, processing circuitry for converting between legacy telephone signals and packet signals, and a cascadable expansion bus permitting multiple said devices to be connected to a common port on a packet network. Such a device is highly scalable.

17 Claims, 2 Drawing Sheets

SCALEABLE VOIP TELEPHONE LINE CIRCUIT

FIELD OF THE INVENTION

This invention relates to the field of telephony, and in particular to a Voice over Internet Protocol (VoIP) telephone line circuit used in (VoIP) gateway equipment at the interface with a packet switched network.

BACKGROUND OF THE INVENTION

Voice over Internet Protocol has created the need for telecommunications equipment to support the conversion from traditional telecom interfaces to packet interfaces. Traditional legacy telecom equipment was based upon a circuit switching fabric with time division multiplex switching (TDM), and TDM transport networks. In VoIP networks, VoIP Gateway equipment is located at the interface with conventional telephone equipment.

VoIP Gateway equipment includes some conventional components, such as line circuits (SLICS and CODECs). Digital Signal Processors (DSPs) and Network Processors (NP) are generally introduced to accomplish the conversion and interface from conventional circuit-switched equipment to the packet network.

Legacy telecom equipment was built with Plain Old Telephone System (POTS) line circuits, and/or T1/E1 circuits, and other higher bandwidth physical layer interfaces, all of which used TDM type serial bus interfaces as the standard interface of choice. This architecture was simple, scaleable, and commonly accepted throughout the industry.

Gateway designs with VoIP capability have not matured to the point where common bus interfaces exist, particularly between the DSP modules and Network Processor devices. Examination of commercial Network Processor devices reveals that many different I/O ports are supported including Utopia II, high-speed serial ports, Ethernet, and various parallel processor ports. Commercial NP devices have Ethernet as a common interface, particularly "Fast Ethernet" or Gigabit Ethernet (MII or GMII). MII is the Media Independent Interface, a standardized bus used to interconnect Ethernet MAC devices with Ethernet PHY devices.

The need to provide Ethernet for 10/100/1000 LAN traffic provides a persuasive argument that the NP port of choice should be Ethernet (MII or GMII), for all physical device ports including voice ports. The task of aggregating traffic from FXS/FXO (Port line circuit to subscriber telephone/Pots line circuit to central office) voice ports, T1/E1 ports and 10/100/1000 data ports (and possibly many other media ports), is one that is best done in an all Ethernet environment if possible.

The devices that interface all media with Ethernet are aggregated by a Network Processor. This is a relatively new philosophy for FXS/FXO ports, because it is proposed that most digital signal processing required for an FXS/FXO port be distributed onto the line interface circuit itself. While many integrated VoIP devices currently exist with DSP and RISC processors on-chip today, the intention to performing all DSP media processing as well as all packet processing, is not attractive due to voice port scaling issues. It is preferable to leave the NP functionality on a commercial HOST/NP in order to exploit the full potential of constantly improving processor technology and software development environments. The software environment appears to be increasingly based upon LINUX, Open Source software, and legacy application code.

The basic components of a typical VoIP gateway, IP-PBX, or Communication Server are shown in FIG. 1. The line circuits (SLIC/CODEC) $10_1 \ldots 10_6$ are typically the same devices used by traditional TDM equipment, and interface to DSP devices $12_1 \ldots 12_3$ (via TDM bus) to provide the necessary digital media processing to prepare the telephone signals for a VoIP network interface. Table 1 indicates some of the typical media processing tasks provided by DSP devices $12_1 \ldots 12_3$.

TABLE 1

Media Processing Functions

Echo cancellation
Noise reduction
Voice Codecs: G.711, G.729AB, G.723.1, G.726
DTMF Tx/Rx
VAD/CNG/PLC
T.38 and VBD Fax Relay
3-way calling
Lost packet concealment
Programmable Tone Generation
FSK (Caller ID)
Adaptive Jitter Buffer
Gain Control The DSP devices $12_1 \ldots 12_3$ in turn interface to a Network Processor or Host processor 14 to perform the necessary packet processing to prepare the voice packets for transmission over a packet based network. The network processor 16 is associated with memory 16. The particular interface is not standardized, and many methods are can be used to implement the interface. This includes proprietary FPGA interfaces, or proprietary high-speed serial buses, Utopiall, etc. In the present example, an FPGA interface 18 is used.

Table 2 indicates some of the packet processing functions typically provided by a Network Processor. The functions provide by the SLICS $10_1 \ldots 10_6$ are shown in Table 3.

TABLE 2

Network Processor Functions

Signalling e.g. SIP, H.323, MGCP
RTP/RTCP
Security Processing
Firewall
Call-Processing
Packet Re-ordering and other packet processing functions
System applications

TABLE 3

SLIC functions

Transformer-less 2 W/4 W conversion
2 W Impedance matching
Adaptive Linear Trans-hybrid ECAN
Balanced Sinusoidal Ringing Generation
PWM controller for external switching power supply (per line).
Off-hook and dial pulse detection
Tip & Ring ground over-current protection
24 mA constant current feed *
Line Polarity Reversal
Meter Pulse Injection
Ring trip detection
Programmable DC feed
Ground Button Detect
Battery voltage feeding
Transversal current sensing
Longitudinal current sensing
Overload protection

TABLE 3-continued

SLIC functions

On-hook transmission
Ringing amplification

In small systems the DSP and NP are often integrated into a single device to provide the most cost-effective integrated solution. This present invention does not apply to such a case if the application does not require expandability of voice ports.

There is however a need for a simple-to-use, scaleable VoIP line circuit that can be easily interfaced to a central Host processor.

SUMMARY OF THE INVENTION

An object of the present invention is to offload DSP media processing required for voice ports from the network processor, thus freeing the network processor for media aggregation tasks, security, firewalls, and other packet processing, while providing a standard interface bus method (Ethernet MII). The protocol for packet transfer between voice ports and a network processor remains simple and inexpensive, and the Network stack is light on memory and CPU cycles.

As the need for DSP cycles and memory scales linearly with the number of voice ports in a system, the need for packet processing cycles and memory does not. The present invention also provides a solution to the scaling problem present in most Gateways, IADs, and Communication servers.

According to the present invention there is provided a telephone subscriber line device for providing an interface between a legacy telephone circuit based on circuit-switched technology and a packet network, comprising a legacy interface for connection to telephone circuit; a packet interface for connection to a packet network; processing circuitry for converting between legacy telephone signals and packet signals; and a cascadable expansion bus permitting multiple said devices to be connected to a common port on a packet network.

The cascadable expansion bus permits a plurality of similar devices to send and receive packet traffic on the same Ethernet port. Ethernet was originally designed to be a "multi-drop" technology although this was done with the use of Ethernet PHY devices and a protocol called CSMA/CD. CSMA/CD is not considered a deterministic method of arbitrating multiple device traffic, nor is it used anymore with fast Ethernet and Gigabit Ethernet standards. In the case of this invention, the interconnection of voice ports to Network Processor device will not typically use Ethernet PHY devices, and instead will use a single MII port (no PHY) and multiple VoIP line circuits with a shared Expansion Bus that allows packet traffic to be directed to and from the single MII Ethernet Port.

Additionally, a deterministic arbitration method is used to aggregate packet traffic to/from multiple devices over the Expansion Bus before interfacing with the single Ethernet port. The arbitration method allows only one device at a time to transmit or receive packets over the Expansion bus. The NP is connected to the single MII port, The NP will see a single MAC address with multiple IP addresses.

Further, the dedicated Expansion bus can also be used to transmit and receive communication messages between the VoIP devices sharing the bus. Indirect memory access from the host in one device to the memory space of another device on the Expansion Bus is also possible. A VoIP line circuit designed for scaleability of telephone line circuits within Voice over IP Gateway equipment.

The present invention thus provides a line interface circuit that terminates a 2-wire analog "POTS" telephone line, and provides the necessary analog and digital signal processing to convert the signals to/from packet format for interface with an Ethernet port. The invention provides a simple method of cascading multiple line circuit devices onto a single Ethernet "MII" port, without the use of Ethernet PHY devices and CSMA/CD. The problem solved by this invention is how to interface line circuits to a central Host Processor or Network Processor (herein called NP) within the equipment, or between separate cards, shelves, or racks of equipment.

Further, the invention provides a simple method of adding, expanding, or scaling the number of voice ports in a system, and a method of abstracting the VoIP line circuits in the hardware and software sense, from the Host processor subsystem.

Further, the invention provides a simple method of communication among the embedded processors within the cascaded VoIP line circuit devices.

Further, the invention provides the ability to implement Ethernet port redundancy to allow the system to switch from a failing primary Ethernet port to a secondary port without the need to reinitialise the VoIP system.

Further, other traditional telecom ports such as T1/E1 lines can be interfaced using the same method.

BRIEF DESCRIPTION OF THE DRAWINGS

The invention will now be described in more detail, by way of example only, with reference to the accompanying drawings, in which:—

DETAILED DESCRIPTION OF THE PREFERRED EMBODIMENTS

The following references are herein incorporated by reference: IAX Protocol Description, Mark Spencer, Frank W. Miller, Mar. 23, 2004; IEEE 802.3u Fast Ethernet Standard Recommendation; IETF RTP/RTCP; and ITU-T Recommendations G.168, G.711, G.729AB, G.723.1, G.726, H.323, T.38.

Figure 1:
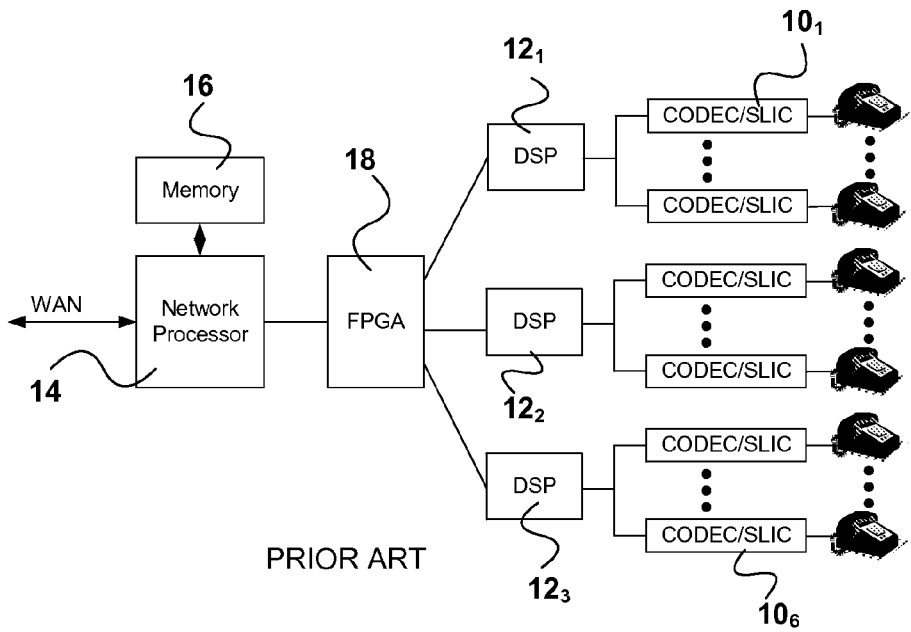
FIG. 1 is a block diagram of a typical prior art VoIP Gateway Architecture.
Figure 2:
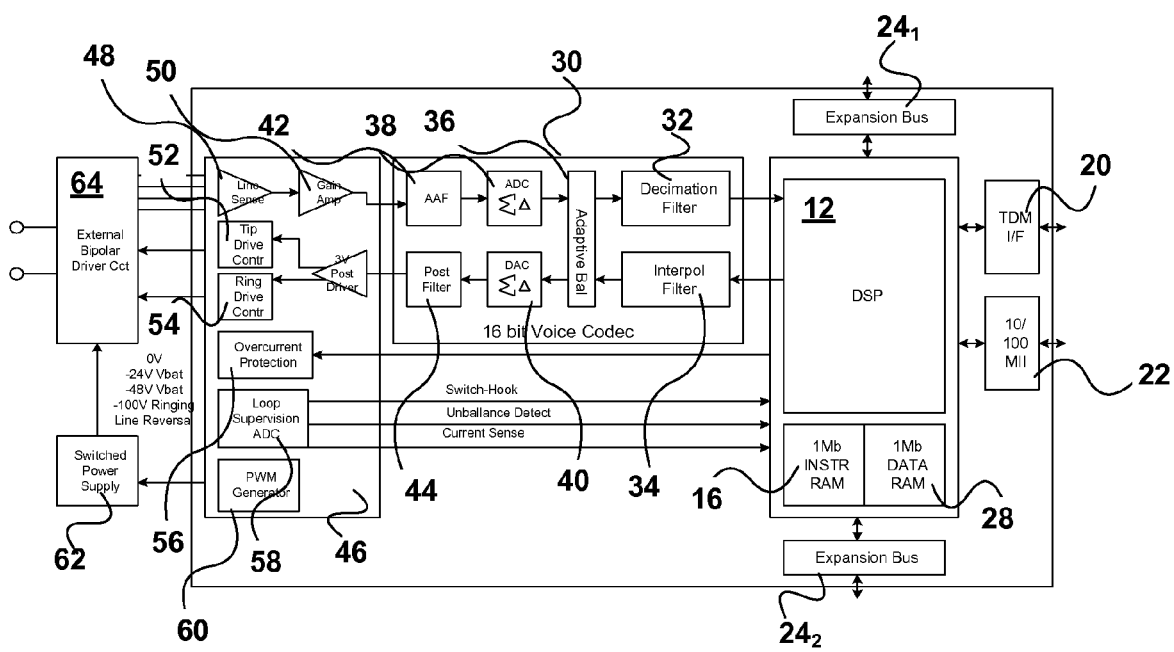
FIG. 2 is a block diagram of a single port VoIP Line Circuit Device in accordance with one embodiment of the invention.

The preferred implementation "VoIP Telephone Interface" is a complete solution for the interface between a POTS telephone line and a Network Processor. The integrated circuit device, along with an external Bipolar Driver circuit, provides a CMOS subscriber line circuit, a 16 bit linear codec, and a DSP to provide all required VoIP media processing for VoIP or TDM line circuit. Such an implementation is shown in FIG. 2. Here DSP 12 is connected to TDM interface 20 and 10/100 MII interface 22. The DSP 12 is connected to expansion buses 241, 242. The DSP also includes instruction memory 26 and data memory 28.

The DSP 12 is connected to a 16 bit voice codec 30, which includes decimation filter 32, interpol filter 34, adaptive balancer 36, analog-to-digital converter 38, digital-to-analog converter 40, anti-aliasing filter 42, and post filter 44. The voice codec provides four 16 bit ADCs and DACs, with on-chip bandgap reference. Dynamic range is extended beyond that of normal G.711 requirements and echo cancellation/noise reduction is applied to the extended range linear signal prior to any voice coding.

The voice codec is connected to I/O circuit 46, which includes line sensing circuit 48, gate amplifier 50, tip drive controller 52, ring drive controller 54, overcurrent protection circuit 56, loop supervision ADC 58, and pulse width modulation generator 60. The PMW generator 60 is connected to switched power supply 62, which is in turn connected to the external bipolar driver circuit 64 for connection to a two-wire conventional POTS Tip and Ring telephone line.

In an alternative embodiment the device is device for connection to a T1, E1, or J1 interface. This would use a T1/E1/J1 type LIU and Framer. No analog SLIC or Codec circuits are necessary in this case, but an identical cascade-able expansion bus is required allowing multiple ports to be combined onto one MII Ethernet port.

This solution provides designers with the means to provide a scaleable gateway or linecard designs from only 1 FXS or FXO line up to 100 lines cost effectively. The device interfaces to a Network Processor via MII Ethernet, providing a common method of transferring packet voice traffic, control signalling, and device boot loading.

The device provides integrated DSP media processing functions that offload the most computationally intensive tasks from the Network Processor such as voice compression, echo cancellation, and fax relay. The device provides a cost effective distributed DSP gateway architecture with guaranteed per channel DSP resource availability.

The device architecture also frees valuable CPU cycles from the Network Processor in the system, leaving more CPU resources available for packet processing and customer application software tasks. Packet processing, signalling functions (SIP or H.323), call processing, security processing, firewall, Ethernet switching or bridging, as well as customer application software are assumed to be provided by the Network Processor in the system.

The device is designed to operate with short or long analog subscriber loops. The integrated 16 bit linear codecs provide superior signal to distortion performance, enabling the integrated DSP to achieve higher performance echo cancellation and noise reduction than normally provided by DSP pools or "network positioned" voice enhancement equipment. What that means is that standardised network echo cancellers based upon G.168 communicate with line circuits via G.711 coded speech. This G.711 coding creates a hard limit in echo canceller performance beyond which the network echo canceller can never exceed.

The present invention provides echo cancellation and Noise Reduction technology based on 16 bit linearly coded speech, prior to any voice coding (e.g. G.711, G.723.1, G.729 etc.). This creates the ability to eliminate the NLP (Non-Linear Processor which is part of a Network Echo Canceller), on most voice calls, thus providing a new level of performance for VoIP calls. Note, NLP devices are generally considered one of the things that most affects voice and Fax performance quality in legacy circuit switched networks, as well as NGN VoIP networks.

The packet signalling and media interface architecture is based upon Ethernet (MII) and the RTP/RTCP protocol, or something else such as the IAX (or IAX2) [1] protocol, which is a light-weight protocol developed by Asterisk™ (Open source PBX software) for VoIP media and signalling over packet networks. IAX is actually available as a replacement for SIP or MGCP, or may coexist with these other signalling protocols in a NP or Host processor. IAX was developed as a low complexity, low bandwidth alternative to SIP or MGCP, and appears to be appropriate for use with this invention. In IAX, media (voice packets) and signalling packets are both transmitted over the same UDP port, thus avoiding the problems that SIP has with NAT. This may not be a particularly important feature for this device when connected directly to a local NP. It does however provide an opportunity for the device to inter-operate with Asterisk™ based systems where the NP functionality is provided by open source software residing on a conventional PC host running Linux™ OS. IAX consists of only a few defined packets, all of which use simple binary fields rather than text based commands like SIP.

Figure 3:
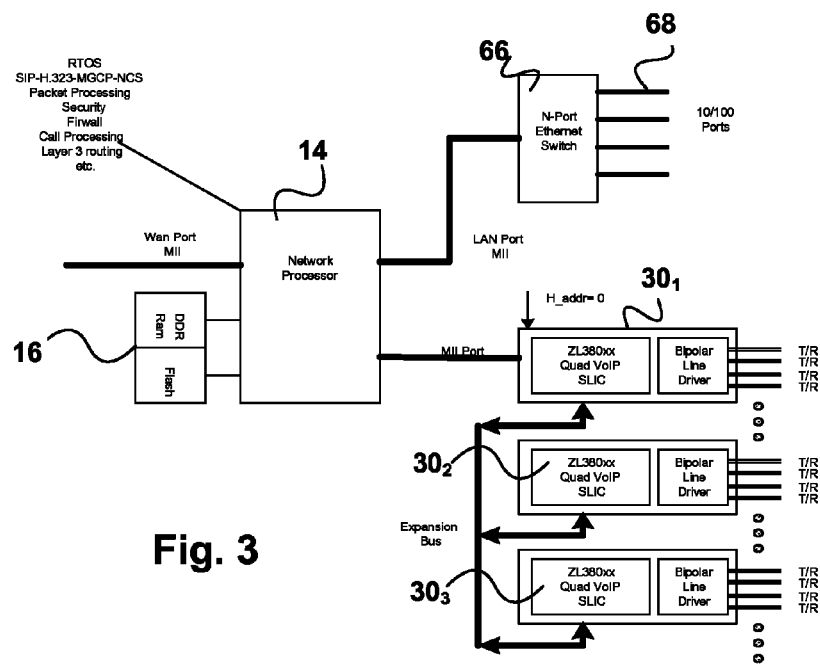
FIG. 3 illustrates a Cascadable VoIP Architecture.

Referring to FIG. 3, the network processor is connected to an N-port Ethernet switch 66 having a plurality of 10/100 ports 68. The MII port of the network processor 14 is connected to the first SLIC $30_1$, which in turn is connected through its expansion bus to the second SLIC $30_2$ and third SLIC $30_3$. This architecture thus provides an easily scaleable interface between the bipolar POTS lines and the packet switched networks.

Figure 4:
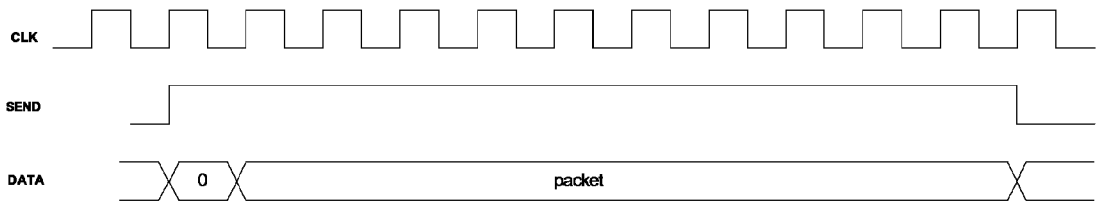
FIG. 4 shows the timing for a Master Ethernet Packet Broadcast on the Expansion Bus.
Figure 5:
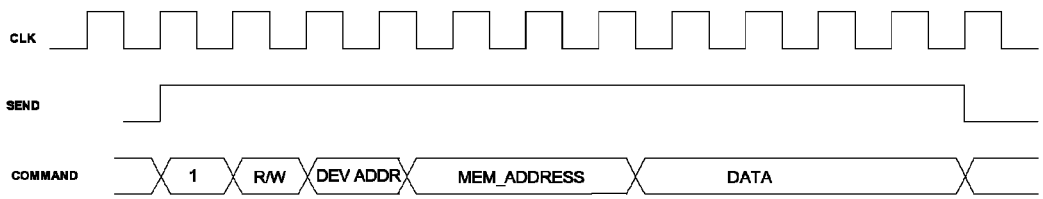
FIG. 5 shows the timing for a Master Memory Access on the Expansion Bus.

Arbitration is performed as illustrated in FIGS. 4 and 5. Each device is uniquely identifiable using a unique hard-wired address. A master device is assigned address 0.

The first device (address 0) must automatically assume some tasks that the other devices do not. Firstly this 'master' device provides an Expansion Bus clock output (Minimum 25 MHz) to all other devices so that they are all synchronous to this same clock. Secondly, the 'master' device controls which device will be allowed to transmit on the Expansion Bus at any given time. The 'master' device provides an output address counter (A_Count), which all other devices use as input. This address identifies each device sequentially and allows it to transmit. The method is round-robin, with a WAIT signal (open drain) used by each 'slave' device to indicate that it has a packet to transmit, and that the 'master' device should not increment the count address value until the WAIT response is released.

For received Ethernet packets (from the MII bus), the master device broadcasts the packet on the expansion bus to be received by all slave devices.

Each packet sent or received on the expansion bus starts with a bit flag that has a value of 0 for the normal Ethernet mode and a value of 1 for a memory read or write access. It will be appreciated by one skilled in the art that many other variations are also possible.

Embodiments of the invention offer a number of advantages. A line circuit component provides the conversion between analog POTS Tip and Ring 2-wire analog and a packet interface (Ethernet). Each circuit component may support from 1 to 8 POTS lines. The number of line circuit ports within a system can be expanded without impacting the architecture, or the current choice of Network Processor device, and without significant impact to the software resident within the Network Processor. The voice ports can be extracted from the system at the hardware level. This means that the voice ports can be located either on the same motherboard as the NP, or on other cards (line cards), or other equipment shelves, other remotely located equipment such as wiring closets etc. The enabling bus technology is Ethernet, and in some cases a PHY may be used to interconnect groups of these line circuit devices to an NP that is remotely located.

Embodiments of the present invention avoid the need for expensive Ethernet switches that would otherwise be needed to aggregate voice ports if they were all provided with separate Ethernet interfaces. Also avoids the QoS (Quality of Service) issues that arise with aggregation using Ethernet switches, because the aggregation of packets is instead done with a deterministic round robin arbitration method, making use of the knowledge that only short voice packets are being aggregated (as opposed to the requirement for an Ethernet switch to aggregate packet traffic from any source, with any size of packet).

The ability to abstract call control and telephony signalling at the software level is an important advantage. What this means is that a centralised "Communication Server" can be constructed with a compute resource (e.g. Network Processor or Host processor). Open Source software may be used with common signalling and packet voice interfaces which have already been developed to control voice port devices with TCP/IP, UDP, RTP, SIP, IAX, etc. and Ethernet.

The host processor on any one VoIP line circuit device can use the free resources on another device via the Expansion Bus through the indirect memory access capability provided.

Some examples of next generation network equipment that the invention applies to are: VoIP Embedded Analog Terminal Adapters; SOHO and Residential Gateways; Enterprise/PBX Gateway Linecards; Communication Servers; PON ONU Gateways; Passive Optical Network (PON) Access Gateway cards; CABLE embedded Multimedia Terminal Adapters; Integrated Access Devices; Access Gateways; Wireless Local Loops; and Softswitch/PBX (e.g. Open Source Software based) FXS/FXO cards.

The following table contains a list of abbreviations used in this specification.

| Term | Definition |
| --- | --- |
| 10/100 | 10 Mbps or 100 Mpbs Ethernet |
| 3-way calling | Three party conference bridge |
| 802.3u | IEEE Fast Ethernet Standard Recommendation |
| ATA | Analog Terminal Adapter |
| CMOS | Complementary Metal Oxide Semiconductor |
| CNG | Comfort Noise Generation |
| CSMA/CD | Carrier Sense Multiple Access/Collision Detect |
| DSP | Digital Signal Processor |
| DTMF | Dual Tone Multi-Frequency |
| ECAN | Echo Canceller |
| FPGA | Field Programmable Gate Array |
| FSK | Frequency Shift Keying |
| FXO | Pots line circuit (to central office) |
| FXS | Port line circuit (to subscriber telephone) |
| G.711, G.729AB, G.723.1, G.726 | ITU-T recommendations for Voice Codecs |
| Gateway | In this context, a box that connects two networks (IP and TDM) |
| H.323 | ITU-T recommendation for multi-media terminals |
| IAD | Integrated Access Device |
| IAX | Inter Asterisk ™ Protocol |
| IP-PBX | Internet Protocol Private Branch Exchange |
| LINUX | An open source operating system |
| LIU | Line Interface Unit |
| MAC | Media Access Controller |
| MGCP | Media Gateway Control Protocol |
| MII | Media Independent Interface |
| NGN | Next Generation Network |
| NLP | Non-linear-processor, part of an echo canceller |
| NP | Network Processor |
| ONU | Optical Network Unit |
| PBX | Private Branch Exchange |
| PHY | Physical Layer interface (circuit) |
| PLC | Packet Loss Concealment |
| PON | Passive Optical Network |
| POTS | Plane Old Telephone System (or circuit) |
| PWM | Pulse Width Modulated |
| QoE | Quality of Experience |
| QoS | Quality of Service |
| RISC | Reduced Instruction Set Computer |
| RTP/RTCP | Real Time Protocol/Real Time Control Protocol |
| SIP | Session Initiation Protocol |
| SLIC | Subscriber Line Interface Circuit |
| Soft-switch | A switching system implemented by software on a compute platform |
| SOHO | Small Office Home Office |
| T.38 | ITU-T recommendation for Fax over packet networks |
| T1/E1/J1 | North American/European/Japanese multiplex TDM carrier circuits |
| TCP/IP | Transmission Control Protocol/ Internet Protocol |
| TDM | Time Domain Multiplexing |
| Tip and Ring | The two wires on a telephone circuit |
| UART | Universal Asynchronous Receiver Transmitter |
| UDP | User Datagram Protocol |
| Utopiall | A bus used for ATM primarily |
| VAD | Voice Activity Detection |
| VBD | Voice Band Data mode |
| VoIP | Voice over Internet Protocol |

We claim:

1. A telephone subscriber line device for terminating an analog subscriber telephone line, comprising:
   a legacy interface for connection to the analog subscriber telephone line;
   a packet interface for connection to a packet network;
   a codec connected to said legacy interface for converting between analog and digital format;
   a processor connected between said codec and said packet interface for performing VoIP media processing and exchanging VoIP packets with the packet network through said packet interface;
   a cascadable expansion bus connected to said processor for connection to a cascadable expansion bus of at least one like telephone subscriber line device acting as a slave device to permit multiple said telephone subscriber line devices to be connected to a packet network via said packet interface acting as a common port for all said telephone subscriber line devices; and
   wherein said processor is configurable to broadcast packets received via said common port to said at least one like telephone device acting as a slave device over said expansion bus; and
   wherein said processor is configurable to control transmission by said at least one like telephone device acting as a slave device of packets for transmission to the packet network via said packet interface acting as a common port.

2. A telephone subscriber line device as claimed in claim 1, wherein said common port is an Ethernet MII port.

3. A telephone subscriber line device as claimed in claim 1, wherein said legacy telephone circuit comprises a tip and ring telephone line.

4. A telephone subscriber line device as claimed in claim 1, further comprising a time division multiplexed interface.

5. A telephone subscriber line device as claimed in claim 1, wherein said processor comprises a digital signal processor.

6. A telephone subscriber line device as claimed in claim 4, wherein time division multiplexed interface is selected from the group consisting of a T1, E1, and J1 interface.

7. A telephone subscriber line device as claimed in claim 4, wherein said expansion bus includes an expansion bus protocol providing redundancy and fault protection.

8. An interface to a plurality of analog telephone subscriber lines, comprising;
   a plurality of telephone subscriber line devices, each comprising:

a legacy interface for connection to a said analog telephone subscriber line;

a packet interface for connection to a packet network;

a codec connected to said legacy interface for converting between analog and digital format;

a processor connected between said codec and said packet interface for performing VoIP media processing and exchanging VoIP packets with the packet network through said packet interface; and a cascadable expansion bus port connected to said processor; and an expansion bus connected to each cascadable expansion bus port of said plurality of telephone subscriber devices;

wherein one of said plurality of telephone subscriber devices acts as a master device and the packet interface thereof acts as a common port for all said telephone subscriber devices; and wherein the or each remaining telephone subscriber device acts as a slave device receiving packets from and transmitting packets to said master device over said expansion.

9. An interface as claimed in claim 8, wherein said common port is an Ethernet MII port.

10. An interface as claimed in claim 8, further comprising an expansion bus protocol wherein upon detection of a fault in said master device, a said slave device becomes the master device.

11. An interface as claimed in claim 8, wherein said expansion bus protocol arbitrates between said master and slave devices.

12. An interface as claimed in claim 8, wherein said master device provides a synchronous clock for all the other devices, and said master device controls which slave device can transmit at any given time.

13. An interface as claimed in claim 12, wherein said master device controls the transmission of said slave devices in a round robin fashion.

14. An interface as claimed in claim 8, wherein said legacy telephone circuit comprises a tip and ring telephone line.

15. An interface as claimed in claim 8, wherein further comprising a time division multiplexed interface.

16. An interface as claimed in claim 15, wherein time division multiplexed interface is selected from the group consisting of a T1, E1, and J1 interface.

17. An interface as claimed in claim 8, wherein said expansion bus includes an expansion bus protocol providing redundancy and fault protection.

* * * * *